Oct. 11, 1949.  W. D. TIPTON  2,484,359

CONTROL BOOSTER FOR AIRCRAFT

Filed May 12, 1945

INVENTOR.
William D. Tipton.
BY
Maxwell K. Murphy.
ATTORNEY.

Patented Oct. 11, 1949

2,484,359

UNITED STATES PATENT OFFICE 2,484,359

CONTROL BOOSTER FOR AIRCRAFT

William D. Tipton, Stoneleigh, Md.; Elizabeth Barrett Tipton executrix of said William D. Tipton, deceased Application May 12, 1945, Serial No. 593,394

3 Claims. (Cl. 244—87)

This invention relates to an improved aerodynamic booster for aircraft controls such as ailerons, elevators, rudders, flaps and the like, whereby the manual effort of the pilot is automatically supplemented by forces generated by the airplane in flight. Such a device is desirable, particularly in large aircraft, to ease the effort required of the pilot in moving the control surfaces of his craft against the airflow over the control surfaces while in flight.

A prime object of the invention is to provide such a control boost without leaving uncovered joints or apertures at the junction of the movable control surface and the main surface.

A further object is to provide means whereby the movable control surface may be statically balanced about its hinge line so that tendency of the control surface to "flutter" under turbulent airflow conditions, etc. may be avoided.

A still further object of the invention is to combine with my improved booster means, means for controlling the boundary layer thereby to increase the overall efficiency of the air-foils.

An additional object is to provide a slot or jet action over the displaced surface whereby turbulence is reduced and the effectiveness of the control surface is increased.

More specifically the invention consists in the provision of means for conducting the impact pressure of an air stream to a portion of a movable control for supplying the power used in assisting movement of the control and to direct an air stream along the surface of one side of the movable control to accelerate the boundary layer so that the air stream will follow the surface of the control when the control has been moved from one position to another.

Other objects and advantages of the invention will more fully appear from the following description taken in connection with the accompanying drawings in which.

Figure 1:
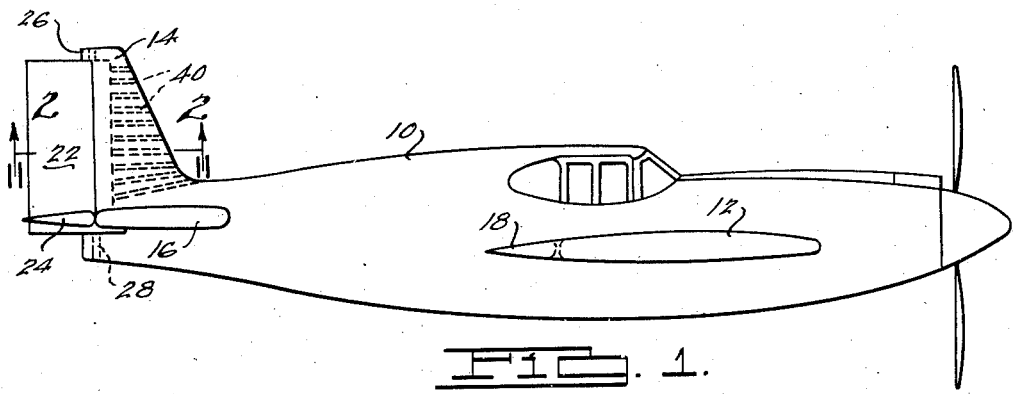
Fig. 1 is a side elevational view of an airplane illustrating an adaptation of the invention, parts being broken away and in section.

Referring to the drawings, I have shown an airplane having a fuselage 10, wings 12, vertical stabilizer 14, and horizontal stabilizer 16. The wings 12 are shown provided with ailerons 18. The vertical stabilizer 14 is provided with a rudder 22 and the horizontal stabilizers 16 are provided with elevators 24. The ailerons 18, rudder 22 and elevators 24 are angularly moved by manually operable means, not shown, of well known design.

While the invention is applicable to the control of ailerons, flaps, rudder or elevators, it has been illustrated as applied to the vertical stabilizer 14 for balancing the control of the rudder 22. It is to be understood that its function and results of operation would be substantially the same for any of the above enumerated installations.

Figure 2:
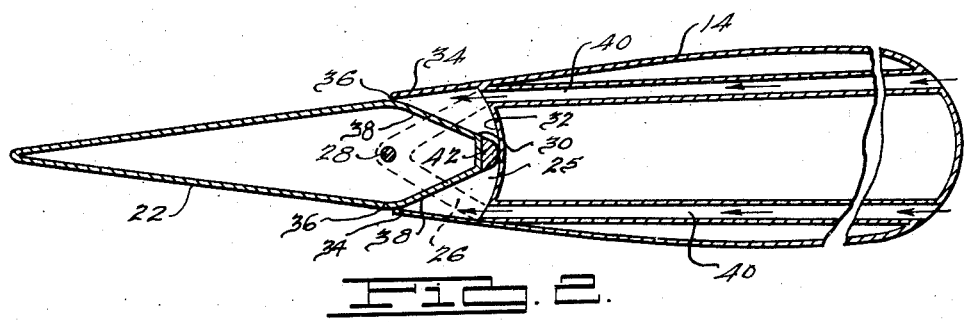
Fig. 2 is an enlarged sectional view taken on line 2—2 of Fig. 1.

Referring now to Fig. 2, the vertical stabilizer 14 is provided with suitable brackets 26 having pintle supports 28 for hingedly supporting the rudder 22 at the trailing edge of the vertical stabilizer 14. The rudder 22 has a portion 30 extending forwardly beyond the pintle supports 28 which swings in a relatively airtight compartment 25. The forward edge of the extension 30 slidingly engages a curved rear surface 32 at the rear edge of the vertical stabilizer 14. Surfaces 34 of the vertical stabilizer are extended beyond the rear outer edges of the curved surface 32 to a point substantially in transverse alignment with the pintle supports 28.

The rudder 22 has a width adjacent the pintle supports 28 equal to the distance between the rear edges of the spaced extensions 34 and the outer surface of the rudder forms a continuation of the surfaces of the vertical stabilizer 14 and the extensions 34, gradually diminishing in thickness to the trailing edge, as is usual in airplane design.

The forward extension 30 decreases in thickness toward the curved surface 32 thus dividing the compartment 25 into two closed chambers when the rudder is in the position shown in Fig. 2. The surfaces of the rudder 22, where they are in sealing engagement with the rear edge of the extensions 34, are curved as at 36 so as to cooperate in a substantially airtight manner with the inner surfaces of the extensions 34 when the rudder is in its neutral position. However, when the rudder is angularly moved in one direction about its pivotal support, one of the tapered surfaces 38 of the extension 30 moves away from the rear edge of the cooperating surface extension 34 as illustrated in Fig. 3.

Figure 3:
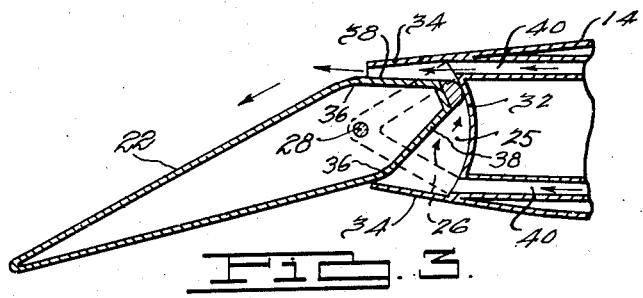
Fig. 3 is a view corresponding to Fig. 2 showing the rudder in a moved position.

As illustrated in Fig. 3 the rudder 22 has been moved to a position for making a right turn. In this position the chamber 25 is opened at one side between the edge of the surface extension 34 and the tapered surface 38 of the forward extension 30 permitting air to escape along the outer surface of the rudder 22. That portion of the compartment on the opposite is closed by the frictional engagement of the surface extension 34 with the curved surface 36.

A plurality of tubular conduits 40 are arranged in the body of the vertical stabilizer 14 which have one end open to the atmosphere at the forward edge of the stabilizer and the opposite end open to chamber 25 on opposite sides of rudder extension 30. These tubes 40 are arranged in pairs as shown. The inlet openings to the chamber have been arranged adjacent the outer surfaces of the stabilizer to permit maximum angular movement of the extension 30 without closing off the inlet openings.

When the plane is in flight the impact air, at the forward edge of the stabilizer, caused by flight, is delivered through the tubes 40 to chamber 25. When the rudder 22 is in neutral position, as shown in Fig. 2 the entire surface of the rudder is in substantially static balance about the axis of the pintle supports and equal pressure is effective against the tapered surfaces 38 of the forward extension 30. If desired a suitable weight 42 may be formed in the forward extension 30 for balancing the rudder 22 about its pivotal axis.

With the control surface streamlined with the main surface of a stabilizer or a wing, the impact pressures at the leading edge of the main surface are conducted through the tubes 40 to the chamber 25 and pressure is applied equally on both sides of the rudder extension 30. If the pilot desires to move the surface in either direction, for example to the right as shown in the drawing, the initial movement of the surface will require relatively little effort due to the fact that the movable surface will not swing appreciably outward into the air stream. However, this initial movement will open a gap between the surface of the left hand extension 34 and the tapered surface 38 of the forward extension 30, illustrated in Fig. 3. This opening will relieve the pressure in chamber 25 on one side of the rudder but the pressure is maintained in chamber 25 on the opposite side thereof. This produces a difference in pressure which will be applied to the right side of the forward extension 30 and will supplement the effort of the pilot in moving the control surface.

The amount of supplemental pressure for the control may be predetermined and may be varied according to the desires of the designer.

In addition to the above, the invention serves another highly useful purpose in that it controls the boundary layer by eliminating the high turbulence created on the "off" side of the control when it is moved for altering the normal direction of the plane.

When an attempt is made to turn the air stream through a large angle, as by turning the rudder or an aileron, it is found that the air stream does not follow the surface after a certain angle to the flow is attained. If however, energy is added to the boundary layer by supplying an air stream between the boundary layer and the surface of the control, the air stream will follow the surface without the undesirable turbulence.

Applying the principle to the rudder of a plane, as selected for illustrating an application of the invention, the following action takes place; when the rudder is swung to the right the air pressure on the right hand side of the rudder surface is increased and the pressure on the left surface is decreased. A partial vacuum is produced on the left side causing a turbulence which decreases the aero-dynamic efficiency of the airfoil. As the rudder is being turned to the right the chamber 25 is increasingly discharging an air stream along the convex surface of the rudder between the boundary layer and the rudder surface, a slot or jet action being produced which washes off the boundary layer and prevents undesirable turbulence.

It will be evident that the application of the principles and features of my invention may be utilized in many locations where air pressure conditions exist from which a motivating air pressure differential can be established for applying balancing forces to the movable surface.

It will be understood that various changes, modifications, additions, eliminations, substitutions and variations may be made without departing from the spirit of my invention and it is not my intention to limit its scope other than by the terms of the appended claims.

I claim:

1. In an airfoil having a fixed section and a movable section, a chamber in the rear of the fixed section; means pivotally connecting the sections, the axis of said pivotal means being disposed such that the leading edge of the movable section is oscillatable in said chamber; slots for conducting air through said fixed section from the leading edge thereof into said chamber on either side of said movable section, said slots and sections being constructed and arranged such that movement of said movable section from a neutral position causes air flowing through said slots to impinge on one side of the movable section forwardly of the pivotal axis thereof to assist movement thereof and to flow over the opposite side thereof to wash off the boundary layer.

2. In combination with an airfoil having a leading portion and a trailing portion hinged thereto and adapted to be moved about a hinged axis for control purposes, a chamber in said leading portion; said trailing portion having a section thereof extending into said chamber forwardly of said hinged axis; said airfoil portions being constructed and arranged such that said chamber is substantially sealed when the trailing portion is in neutral position and is open adjacent the convex side of the airfoil when the trailing portion is in deflected position, and means for conducting air under pressure into said chamber on opposite sides of said section.

3. In combination with an airfoil having a leading portion and a trailing portion hinged thereto and adapted to be moved about a hinged axis for control purposes, a chamber in said leading portion; said trailing portion having a section thereof extending into said chamber forwardly of said hinged axis; said airfoil portions being constructed and arranged such that said chamber is substantially sealed when the trailing portion is in neutral position and is open adjacent the convex side of the airfoil when the trailing portion is in deflected position, and air conducting means connecting the leading edge of said airfoil with said chamber on opposite sides of said section.

WILLIAM D. TIPTON.

REFERENCES CITED

The following references are of record in the file of this patent:

UNITED STATES PATENTS

| Number | Name | Date |
|---|---|---|
| 1,874,278 | Gaines | Aug. 30, 1932 |
| 2,239,475 | Weick | Apr. 22, 1941 |
| 2,331,047 | Schairer | Oct. 5, 1943 |
| 2,368,059 | White | Jan. 23, 1945 |
| 2,387,526 | Nagamatsu | Oct. 23, 1945 |
| 2,416,958 | Sears | Mar. 4, 1947 |

FOREIGN PATENTS

| Number | Country | Date |
|---|---|---|
| 520,962 | Great Britain | May 8, 1940 |
| 642,042 | Germany | Feb. 4, 1937 |